Feb. 19, 1952     W. T. CARSON, JR., ET AL     2,586,002
AIR CYCLE COOLING SYSTEM
Filed June 20, 1949
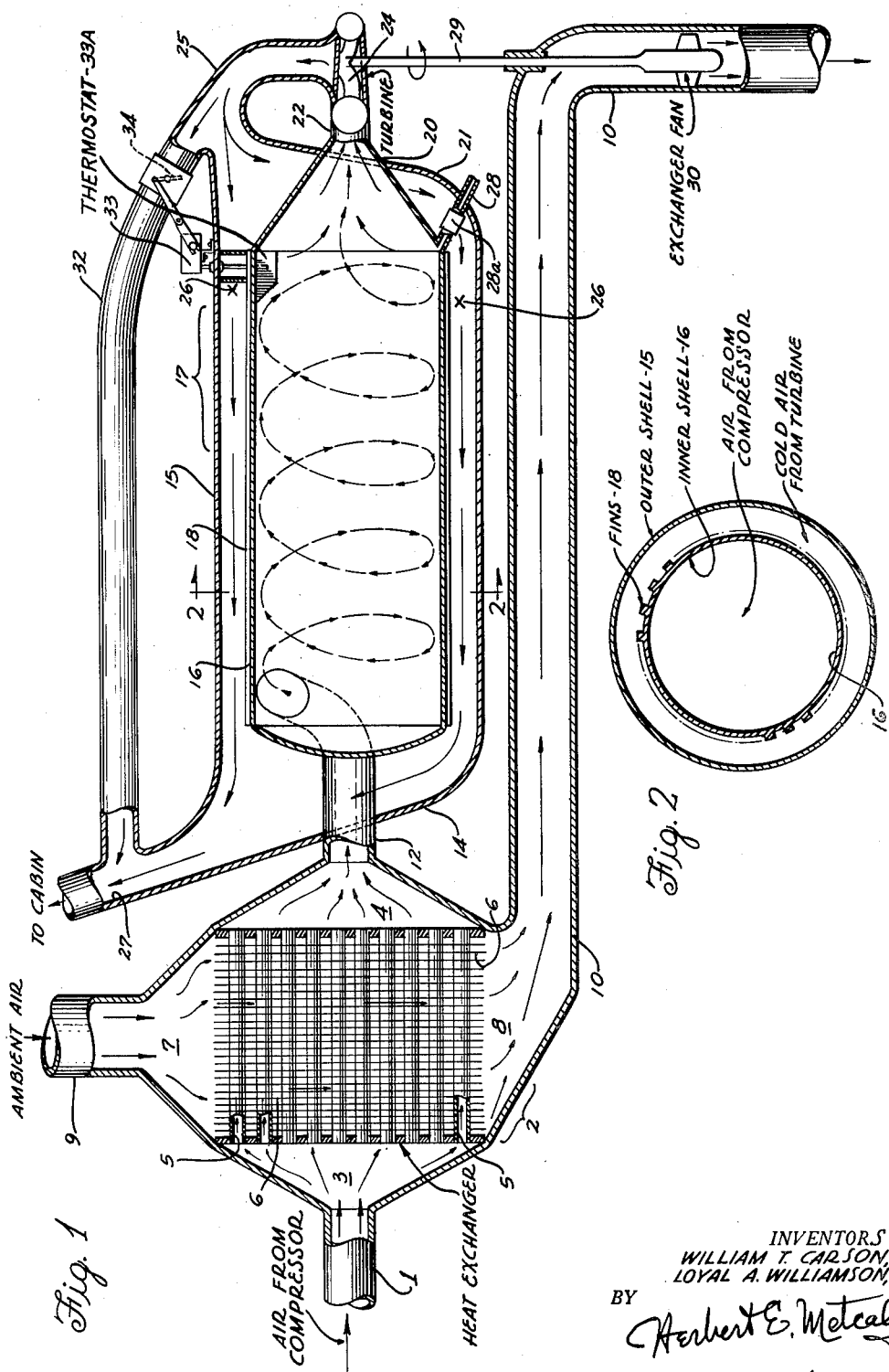
INVENTORS
WILLIAM T. CARSON, JR.
LOYAL A. WILLIAMSON, JR.
BY Herbert E. Metcalf
ATTORNEY Patented Feb. 19, 1952

2,586,002

UNITED STATES PATENT OFFICE 2,586,002

AIR CYCLE COOLING SYSTEM

William T. Carson, Jr., Lynwood, and Loyal A. Williamson, Jr., Los Angeles, Calif., assignors to Northrop Aircraft, Inc., Hawthorne, Calif., a corporation of California Application June 20, 1949, Serial No. 100,278

6 Claims. (Cl. 62—136)

The present invention relates to cooling systems and more particularly to an air cycle cooling system adapted for air conditioning airplane cabins.

Modern airplanes in many instances require special cooling systems for maintaining comfortable conditions for crew or passenger cabins. With the advent of jet engines, for example, many aircraft have available a supply of air at high pressure and high temperature that can be obtained by bleeding off part of the output of the compressor in the jet engine. Consequently, when such an air source is available the airplane will usually utilize an air cycle cooling system.

Briefly, the usual air cycle cooling system utilizes high pressure and high temperature bleed air from the power plant and ducts this air through a heat exchanger, where the bleed air is cooled to some extent by ambient air. The partially cooled bleed air is then expanded in an air turbine to further cool the bleed air, which is then delivered to the airplane cabin. The energy obtained by expanding the bleed air is customarily transmitted to a cooling fan, and dissipated in this fan by forcing ambient air through the heat exchange for the initial cooling of the bleed air.

However, the temperature of the bleed air as it leaves the turbine after expansion therein is frequently so low that it is below the dew point of the bleed air. Consequently, snow, ice and fog form in the ducts between the turbine and cabin, and are blown into the cabin to produce a high relative humidity and cause moisture condensation on windows and the like, besides causing increased pressure drop in the ducting.

It is an object of the present invention to provide an air cycle cooling system of the general type described above in which the water content of the bleed air supplied to the turbine is greatly reduced, thereby reducing the possibility of icing down stream of the expansion turbine.

It is a further object of the present invention to reduce the water content of the bleed air in an air cycle cooling system of the type described without adding appreciable pressure loss to the system during critical cooling conditions.

The invention will be more fully understood by reference to the drawings, in which:

Figure 1 is a schematic diagram generally in section of one preferred form of the present invention.

Figure 2 is a cross sectional view taken as indicated by the line 2—2 in Figure 1.

Referring to the drawings, a bleed air duct 1 is provided, supplied with air under high pressure and at high temperature (due to compression) from any compressor source in an airplane such as, for example, the compressor of a jet engine, a special engine driven compressor, or an engine super charger.

The bleed air is ducted into a heat exchanger 2 having a bleed air inlet space 3 and a bleed air outlet space 4 connected by exchanger tubes 5. Exchanger tubes 5 may be provided with fins 6, and air passages between these tubes connect an ambient air inlet space 7 with an ambient air outlet space 8. Ambient air, supplied through an airscoop (not shown) on the airplane for example, is supplied through an ambient air inlet duct 9 connecting with ambient air inlet space 7. The ambient air outlet space 8 is connected to an ambient air outlet duct 10, referred to later. For high airplane speeds, cooling air from any other source may be fed through the heat exchanger instead of ambient air from the airscoop.

A bleed air outlet duct 12 is connected to bleed air outlet space 4, and this latter duct then passes through the end wall 14 of an outer shell 15 to enter tangentially one end of an inner shell 16, the two shells being concentric and together forming a water separator 17. The inner shell 16 is provided with longitudinal fins 18 as required on its outer surface thereof.

The other end of inner shell 16 tapers down to a turbine inlet duct 20, this duct passing through the other end wall 21 of the outer shell 15 to enter an expansion turbine 22, to turn a turbine rotor 24 therein. The bleed air then leaves the turbine 22 in a turbine outlet duct 25 entering the space 26 between the inner shell 16 and the outer shell 15 of the water separator 17 to pass over the outer surface and fins 18 of the inner shell 16.

At the opposite end of the water separator 17, the outer shell 15 is provided with an exit duct 27 leading to the cabin of the airplane. The inner shell 16 is provided with a lower water outlet 28, containing a water separator valve 28a to drain out condensate without loss of air.

The turbine rotor 24 is connected to a drive shaft 29 extended to pass through the wall of ambient air outlet duct 10 to drive an exchanger fan 30 within the duct.

In operation, the high temperature, high pressure bleed air is forced by the compressor through heat exchanger tubes 5 where it is initially cooled by ambient air passing between and around the tubes 5. The precooled bleed air then enters the inner shell 16, and, by reason of the tangential entrance swirls spirally through the inner shell in contact with the inner surface of this shell. The bleed air then enters the expansion turbine 24, rotates this turbine at high speed, and by its expansion becomes sufficiently cool for use in cooling the cabin of the airplane. This cold air leaving the turbine, however, passes over the inner shell 16 and cools this shell before entering the cabin. The expansion turbine, by driving exchanger fan 30 draws ambient air through the heat exchanger 2.

Fin areas on the inner shell may be selected so as to give an inside surface temperature of the inner shell below the dew point of the bleed air.

The swirling action of the air in the inner shell provides for good mixing of the peripheral cool air with the remainder of the air passing through the inner shell, and this swirling action also aids in causing the condensate to move toward the water outlet 28 to be drained out of the inner shell.

The bleed air, as it enters the turbine, will be cooled slightly, due to the cold surface of the inner shell. Consequently, a lower turbine outlet temperature will result. However, this lower turbine outlet temperature will be counteracted by the fact that the turbine outlet air passing over the inner shell is heated. The net result is that the air entering the cabin will be at a temperature substantially equal to the cabin air entering from a similar air cycle system without the water separator herein described, except for the effect of water extraction on the outlet temperature.

With the water separator in the system as herein described, no fog, snow, or icing conditions will normally obtain in the turbine outlet ducts below the dew point design limit. No appreciable pressure losses are introduced by the water separator under critical condition, and no significant heat losses are encountered over those in prior systems.

A bypass duct 32 is arranged between the turbine outlet duct 25 and the exit duct 27 leading to the cabin of the airplane, so that turbine outlet air can be delivered directly to the cabin. A bypass valve 34 is positioned in bypass duct 32 and is connected to be operated by a temperature control system 33 having a temperature responsive element 33a in contact with the inner shell 16. The temperature control system 33 is set to operate the bypass valve 34 whenever the inside surface temperature of the inner shell drops below the freezing point of water. This action prevents icing on the inside surface of the inner shell 16 under extreme conditions of operation when the turbine outlet air in the space 26 becomes very cold, but does not affect the total volume of cooling air supplied to the airplane cabin. The temperature of the turbine inlet air is thus kept below the dew point thereof and above the freezing point of the moisture therein. The condensate will consequently always drain from the inner shell 16, and the cooling will remain efficient, as ice on the inner shell will greatly reduce cooling efficiency.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statue, the invention has been described in language more or less specific as to structural features, it is to be understood that the invention is not limited to the specific features shown, but that the means and construction herein disclosed comprises the preferred form of putting the invention into effect, and the invention is, therefore, claimed in any of its forms or modifications within the legitimate and valid scope of the appended claims.

What is claimed is:

1. In an airplane cabin cooling system, a source of air at high pressure, an expansion turbine having an outlet, and an inlet connected to receive air from said source and forming one element of a heat exchanger, a divided duct connected at one end to the outlet of said turbine and at the other end to said cabin, one division of said duct conducting air directly to said cabin, the other division of said duct forming the remaining element of said heat exchanger, said divided duct delivering all of the output of said turbine to said cabin only, and means for proportioning the output of said turbine between the two divisions of said duct.

2. In an airplane cabin cooling system, a source of air at high pressure, a first heat exchanger, an expansion turbine having an outlet, and an inlet connected to receive source air from said first heat exchanger and forming the element to be cooled of a second heat exchanger, a divided duct connected at one end to the outlet of said turbine and at the other end to said cabin, the first division of said duct conducting air directly to said cabin, the second division of said duct forming the cooling element of said second heat exchanger, said divided duct delivering all of the output of said turbine to said cabin only, and a thermostatically controlled valve positioned to bypass turbine outlet air through the first division of said duct in accordance with the temperature of said turbine inlet to prevent cooling of said turbine inlet below the freezing point of water.

3. In an airplane cabin cooling system, a source of air at high pressure and temperature, a first heat exchanger, means for moving ambient air through said first heat exchanger to partially cool said source air, an expansion turbine having an outlet, and an inlet connected to receive source air from said first heat exchanger and forming one element of a second heat exchanger, a divided duct connected at one end to the outlet of said turbine and at the other end to said cabin, one division of said duct conducting air directly to said cabin, the other division of said duct forming the remaining element of said second heat exchanger, said divided duct delivering all of the output of said turbine to said cabin only, and means for proportioning the output of said turbine between the two divisions of said duct.

4. In an airplane cabin cooling system, a source of air at high pressure and temperature, a first heat exchanger, a fan for moving ambient air through said first heat exchanger to partially cool said source air, an expansion turbine having an outlet, and an inlet connected to receive source air from said first heat exchanger and forming one element of a second heat exchanger, said turbine being connected to rotate said fan, a divided duct connected at one end to the outlet of said turbine and at the other end to said cabin, one division of said duct conducting air directly to said cabin, the other division of said duct forming the remaining element of said second heat exchanger, said divided duct delivering all of the output of said turbine to said cabin only, and means for proportioning the output of said turbine between the two divisions of said duct.

5. In an aircycle cooling system, means defining a space to be cooled, a source of air at high pressure and temperature, a first heat exchanger, means for moving a cooling fluid through said first heat exchanger to partially cool said source air, an expansion turbine having an outlet, and an inlet connected to receive source air from said first heat exchanger and forming one element of a second heat exchanger, a divided duct connected at one end to the outlet of said turbine and at the other end to said cabin, one division of said duct conducting air directly to the space to be cooled, the other division of said duct forming the remaining element of said second heat exchanger, the elements of said second heat exchanger being proportioned to cool the air entering said turbine below the dew point of said air, said divided duct delivering all of the output of said turbine to the space to be cooled only, and means for proportioning the output of said turbine between the two divisions of said duct to prevent cooling of said inlet air by said second heat exchanger below the freezing point of water.

6. In an aircycle cooling system, means defining a space to be cooled, a source of air at high pressure and temperature, a first heat exchanger, means for moving a cooling fluid through said first heat exchanger to partially cool said source air, an expansion turbine having an outlet, and an inlet connected to receive source air from said first heat exchanger and forming one element of a second heat exchanger, a divided duct connected at one end to the outlet of said turbine and at the other end to said cabin, one division of said duct conducting air directly to the space to be cooled, the other division of said duct forming the remaining element of said second heat exchanger, the elements of said second heat exchanger being proportioned to cool the air entering said turbine below the dew point of said air, said divided duct delivering all of the output of said turbine to the space to be cooled only, and temperature controlled means for proportioning the output of said turbine between the two divisions of said duct to prevent cooling of said turbine inlet below the freezing point of water.

WILLIAM T. CARSON, Jr.
LOYAL A. WILLIAMSON, Jr.

REFERENCES CITED

The following references are of record in the file of this patent:

UNITED STATES PATENTS

| Number | Name | Date |
|---|---|---|
| 2,077,315 | Ewing | Apr. 13, 1937 |
| 2,484,850 | Paget | Oct. 18, 1949 |
| 2,485,590 | Green | Oct. 25, 1949 |